(12) United States Patent
Jatkar

(10) Patent No.: US 8,376,030 B2
(45) Date of Patent: Feb. 19, 2013

(54) REDUCING COST OF HEATING AND AIR-CONDITIONING

(76) Inventor: Jayant Jatkar, Naperville, IL (US)

( * ) Notice: Subject to any disclaimer, the term of this patent is extended or adjusted under 35 U.S.C. 154(b) by 0 days.

(21) Appl. No.: 11/645,437

(22) Filed: Dec. 26, 2006

(65) Prior Publication Data

US 2008/0149301 A1    Jun. 26, 2008

(51) Int. Cl.
*F24J 3/08* (2006.01)
(52) U.S. Cl. ............... 165/45; 165/66; 165/169
(58) Field of Classification Search .......... 165/45, 165/47, 56, 66, 168, 169, 252; 62/260
See application file for complete search history.

(56) References Cited

U.S. PATENT DOCUMENTS

| | | | |
|---|---|---|---|
| 2,210,960 A * | 8/1940 | St. Pierre ................ 165/45 |
| 2,356,392 A | 8/1944 | Fluor | |
| 2,559,868 A * | 7/1951 | Gay ................ 165/45 |
| 2,962,218 A | 11/1960 | Dibert | |
| 3,527,293 A | 9/1970 | Meisse et al. | |
| 4,028,817 A * | 6/1977 | Winstel ............. 165/901 |
| 4,063,590 A * | 12/1977 | McConnell ........... 165/135 |
| 4,138,062 A | 2/1979 | Graden | |
| 4,186,790 A | 2/1980 | Schenker et al. | |
| 4,250,957 A * | 2/1981 | McClendon ............ 165/45 |
| 4,310,044 A | 1/1982 | Schenker | |
| 4,373,346 A | 2/1983 | Hebert et al. | |
| 4,484,564 A | 11/1984 | Erickson | |
| 4,498,526 A * | 2/1985 | Arenas ................ 165/45 |
| 4,694,662 A | 9/1987 | Adams | |
| 4,765,149 A | 8/1988 | Shiga et al. | |
| 4,920,757 A | 5/1990 | Gazes et al. | |
| 5,385,299 A * | 1/1995 | Zawada ............ 165/154 |
| 5,964,101 A | 10/1999 | Schulak et al. | |
| 6,148,629 A * | 11/2000 | Boxum ............... 62/239 |
| 6,494,053 B1 | 12/2002 | Forkosh et al. | |
| 6,749,014 B2 | 6/2004 | Ferraro | |
| 6,793,703 B1 | 9/2004 | Sledge et al. | |
| 7,062,930 B2 | 6/2006 | Rayburn | |
| 7,132,086 B2 | 11/2006 | Michalakos et al. | |
| 7,147,692 B2 | 12/2006 | Fornai et al. | |
| 7,360,580 B2 | 4/2008 | Ferraro | |

\* cited by examiner

*Primary Examiner* — Teresa Walberg
(74) *Attorney, Agent, or Firm* — Andrus, Sceales, Starke & Sawall, LLP

(57) ABSTRACT

A system for heating includes a heat exchanger. The heat exchanger receives hot exhaust from combustion. The heat exchanger uses the heat from the hot exhaust to heat a fluid. A method for heating uses a heat exchanger. The heat exchanger receives hot exhaust and a fluid. The heat exchanger heats the fluid.

20 Claims, 8 Drawing Sheets

HEAT CIRCULATION BETWEEN DRY WALL AND INSULATION

Not to Scale

Figure 1:
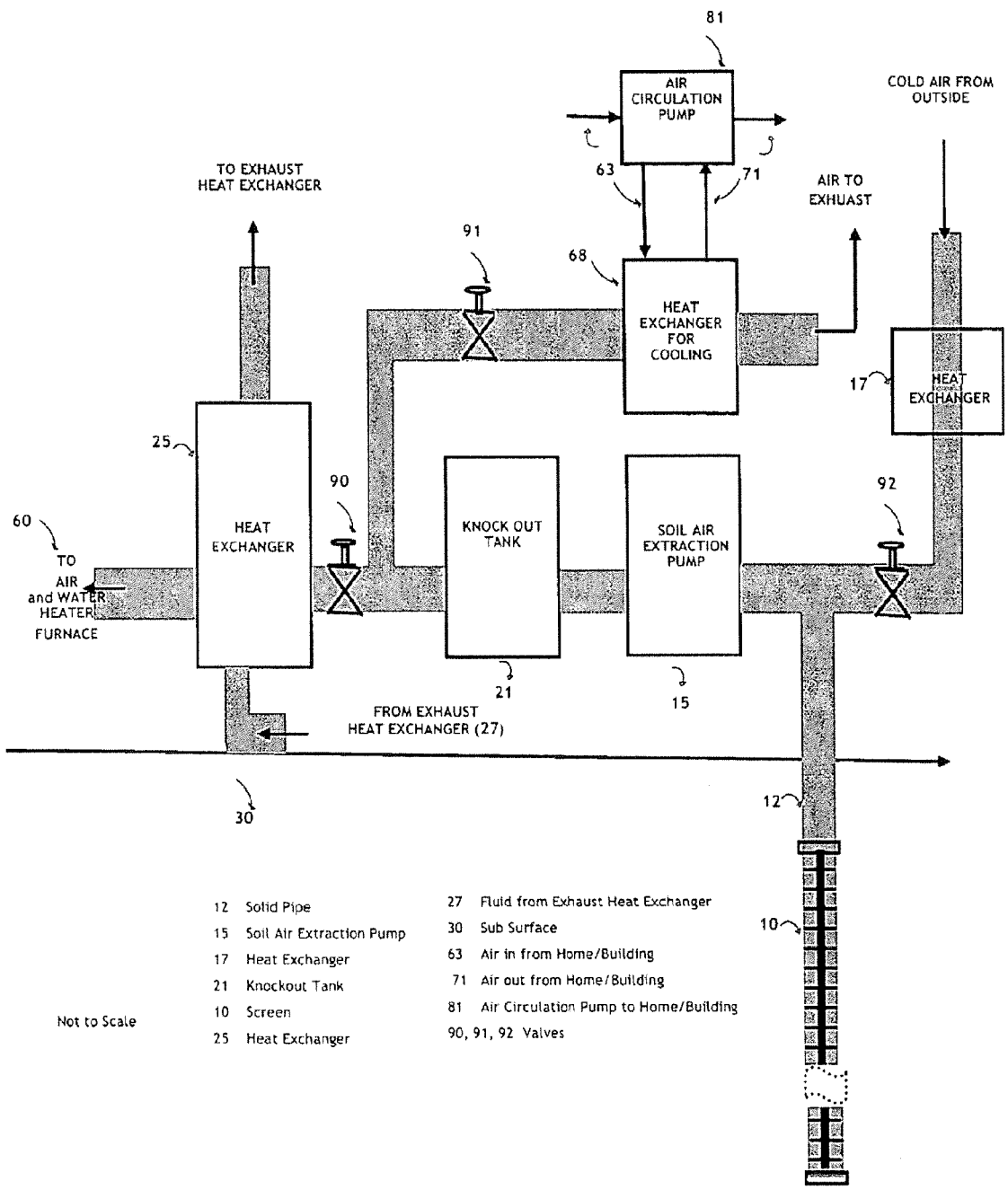

77 Heat Exchanger
33 Water Circulation Pump
92 Heat Exchanger
99 Outside Wall

REFRIGERATOR: HEAT DISCHARGE OUTSIDE THE BUILDING

HEAT RECOVERY FROM OVEN OR DRYER

701 Oven or Dryer
702 Heat Exchanger
703 Furnace to Heat Air to Required Temperature Not to Scale

HEAT RECOVERY FROM FLUE GASES

Not to Scale

801 Furnace Using Outside Cold Air
802 Heat Exchanger
805 Furnace Using Inside Warm Air
806 Heat Exchanger

REDUCING COST OF HEATING AND AIR-CONDITIONING

REFERENCES

| Pat. No. | DATE | INVENTOR |
|---|---|---|
| 4,765,149 | August 1998 | SHIGA et al. |
| 4,920,757 | May 1990 | GAZES |
| 4,694,662 | September 1987 | ADAMS |
| 4,373,346 | February 1983 | HEBERT et al. |
| 6,793,703 | September 2004 | SLEDGE et al |
| 4,310,044 | January 1982 | SCHENKER |
| 4,186,790 | February 1980 | SCHENKER |
| 7,147,692 | December 2006 | FORNAI, et al. |
| 7,132,086 | November 2006 | MICHALAKUS, et al. |
| 7,062,930 | June 2006 | RAYBURN |
| 6,494,053 | December 2002 | FORKOSH, et al. |
| 5,964,101 | October 1999 | SCHULAK, et al. |

BACKGROUND AND SUMMARY OF INVENTION

A. Heating

In the present method, a home or a building is heated by burning natural gas, propane or oil in a furnace. After combustion the flue gas is discharged through a chimney and mainly consists of carbon-di-oxide, water, nitrogen and unburned oxygen. As per the composition of air, for every mole of oxygen is burnt, almost 4 moles of nitrogen (unburned) needs to be included in the combustion. Moreover, excess air (almost 20%) needs to be used in the combustion. Therefore for every mole of oxygen used in combustion, approximately 5 moles of nitrogen exit through the stack. When natural gas is used to burn in a furnace (supplied by utility company) to heat a home or a commercial building in a furnace, heat is transferred through a heat exchanger to heat the air that is circulated in a home or a building. Flue gases exit through a chimney below 150 degree F.

When natural gas (or oil) is burned, for every 100 cubic feet of natural gas is burned, (which is approximately 1 therm of heat as calculated by the utility company) approximately 2,000 cubic feet of air is required to complete combustion. The burnt gases escape through a chimney. This air need to be replaced in a home or a building, therefore outside cold air is sucked into a home or a building. For example, if outside temperature is 0 degrees F., then 0 degree F. air is sucked in a home or a building. If a home or a building is maintained at 70 degree F., then the outside air is heated from 0 degree F. to 70 degree F. Therefore approximately 2,000 cubic feet of air is required to be heated from 0 degree F. to 70 degree F. to maintain the temperature of a home or a building at 70 degree F.

In this invention air is drawn from outside the building is passed through a heat exchanger to recover heat from flue gases and to preheat the cold air. Similarly, hot air that exit through the stack of a oven or dryer can be preheated to recover heat from the exit gases and passed through a heat exchanger of a furnace to obtain required temperature. Similarly, air is drawn by a soil air pump from the subsurface. The temperature of sub surface soil below 6 feet is generally constant around 50 degree F. through out the year. So the air is pumped from the ground pre-heated to between 50 degree F. and 150 degree F. by heat exchange mechanism, by recovering heat from the flue gases. This warm air is pumped into the furnace area to provide for combustion of natural gas or propane or oil. Therefore no outside cold air is sucked into a home or a building after the flue gas exit through the chimney. Use of this method will provide a saving up to 50% in energy cost. Consumption of natural gas or oil used for heating a home or a building depends on the outside temperature.

Additional saving can be achieved by installing a heat exchange system between dry wall and insulation so that entire home or a building beyond dry wall is maintained warm. This is achieved by recovery of heat from the flue gases by heat exchange and circulating water in a closed loop by a pump.

In this method, ground water or municipal tap water is used and outside air is pumped and warmed initially by water and then pre-heated to over 100 degree F. by heat exchange between flue gases and the air supplied to the furnace.

B. Air Conditioning and Cooling

Temperature inside a home or a building is maintained between 70 degree F. to 80 degree F. by air conditioning system during summer months when the outside temperatures are very high and unbearable. In this method cold air from ground is pumped and passed through heat exchanger to cool the air that is circulated in a home or a building. The temperature of a the air pumped from the ground can be as low as 50 degree F., and therefore will be ideal to cool the air that is circulated inside a home or a building.

Ground water or Municipal tap water can be used to run through heat exchanger to cool the air that is circulated in a heat exchanger as described above. This method is very efficient but costlier that one described in B (1).

In this method air pumped by soil air extraction unit. This air is passed through a humidifier and activated carbon to purify air before directly used for circulation inside a home or a building. This method is economical and suitable for commercial buildings.

PRIOR ART

Various methods used by other inventors for heating and air-conditioning/cooling were found during patent search. A method used for filter apparatus is described in earlier method of using geothermal energy for cooling of the heated refrigerant by circulating in a heat exchanger installed in the ground. Various types of devices were used by other inventors for cooling the refrigerant fluid or the pump.

In the heating of a home or a building various heat recovery systems were described after combustion of a natural gas, propane or oil.

In refrigeration system, removal of heat by circulating a fluid in compressor assembly system is described. The heat is removed from the system by circulating a fluid which is disposed off.

DRAWINGS

FIG. 1: SOIL AIR EXTRACTION SYSTEM WITH HEAT EXCHANGE shows systematically how air from ground is pumped and pre heated before combustion of natural gas, propane or oil in a furnace FIG. 2: HEAT RECOVERY FROM EXHAUST FLUE GASES shows systematically how air is pre heated by recapturing the heat from the exit flue gases.

Figure 3:
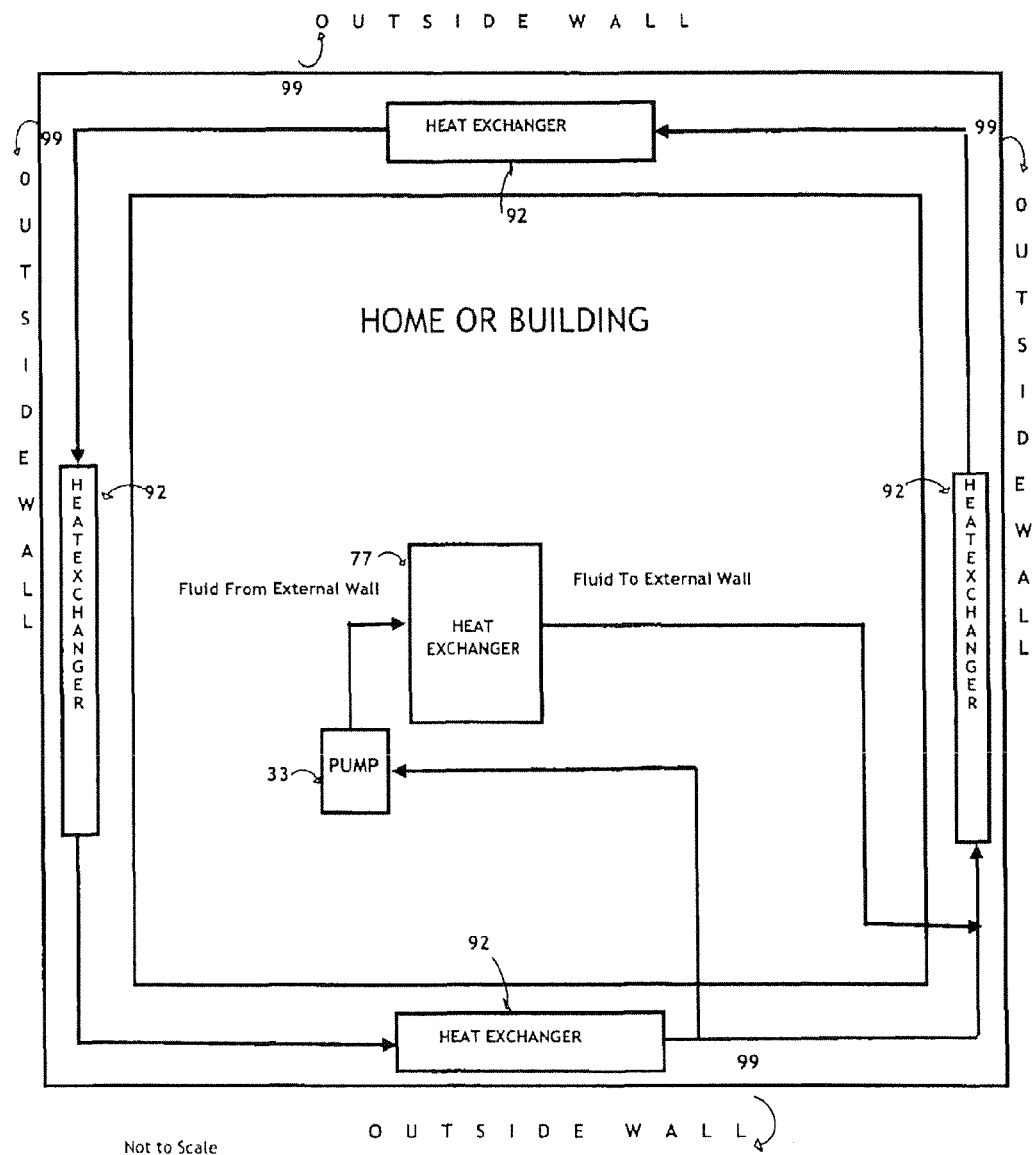

FIG. 3: HEAT CIRCULATION BETWEEN DRY WALL AND INSULATION shows systematically how the area between dry wall and outside wall is heated during winter and cooled during summer.

Figure 4:
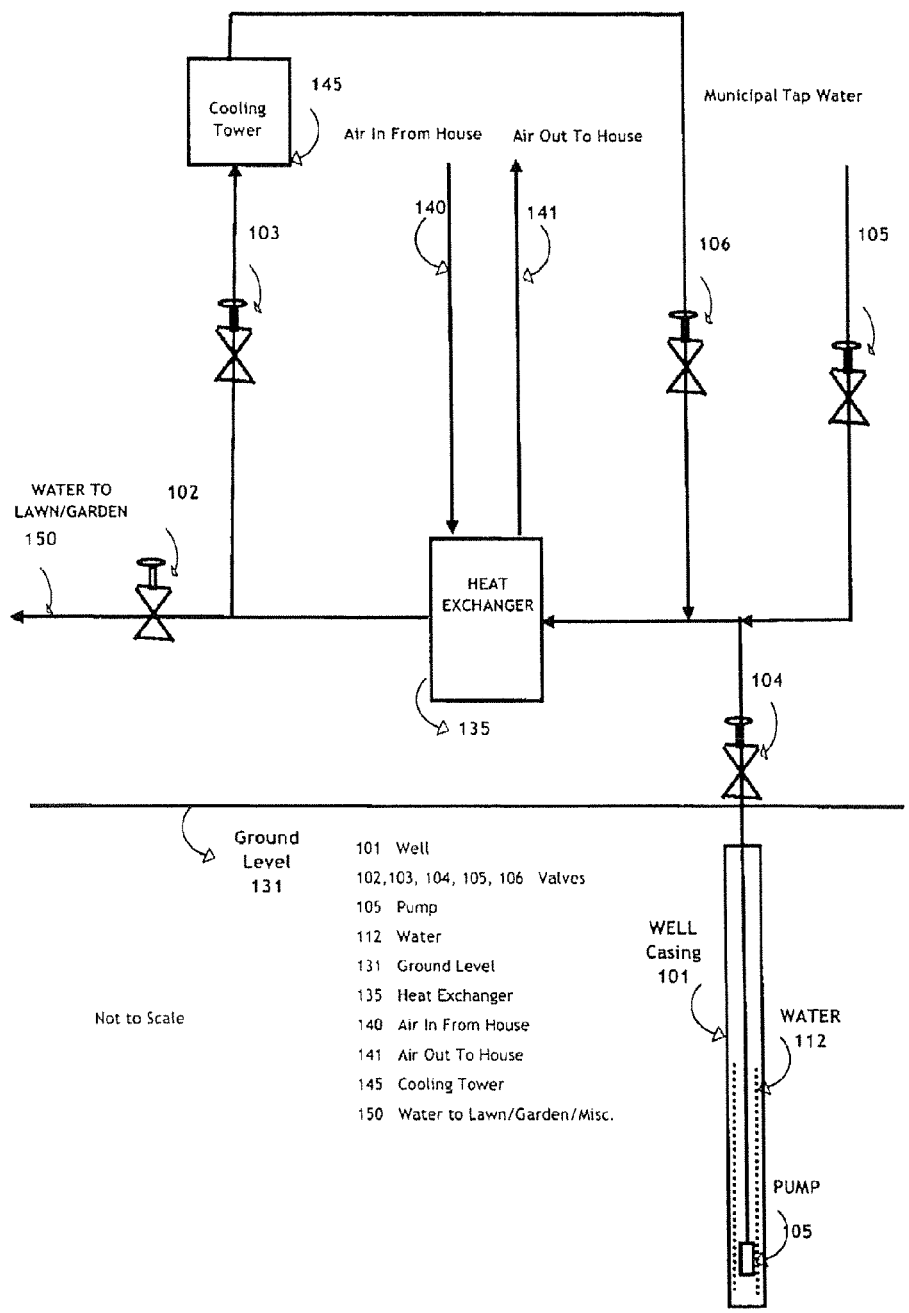

FIG. 4: AIR COOLING BY USE OF WATER shows how systematically ground water or Municipal tap water can be used to cool the air that is circulated in a home or a building.

Figure 5:
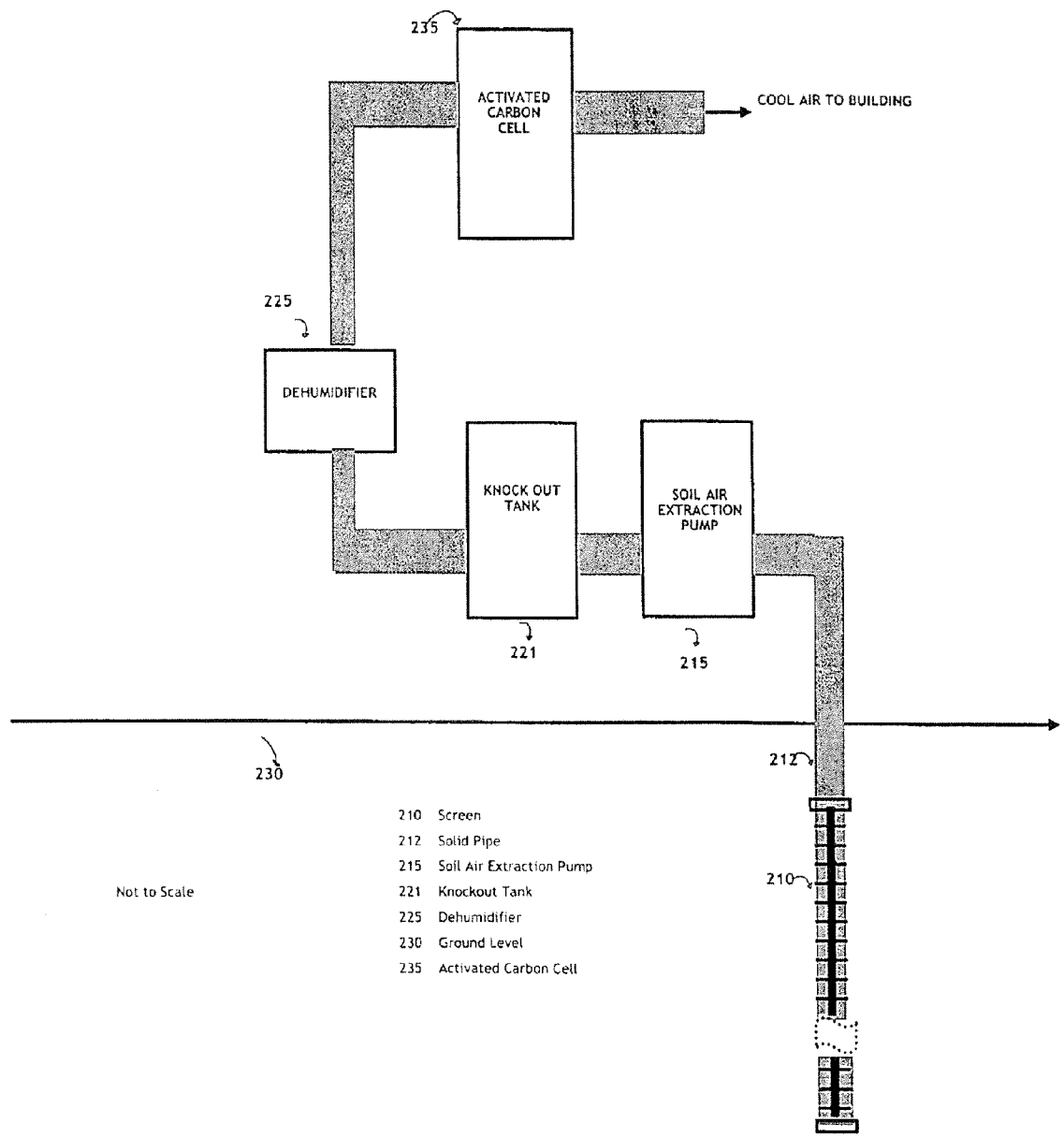

FIG. 5: AIR COOLING FOR HOUSE OR BUILDING shows how systematically air from the ground can be pumped and purified to directly circulate in a home or a building.

Figure 6:
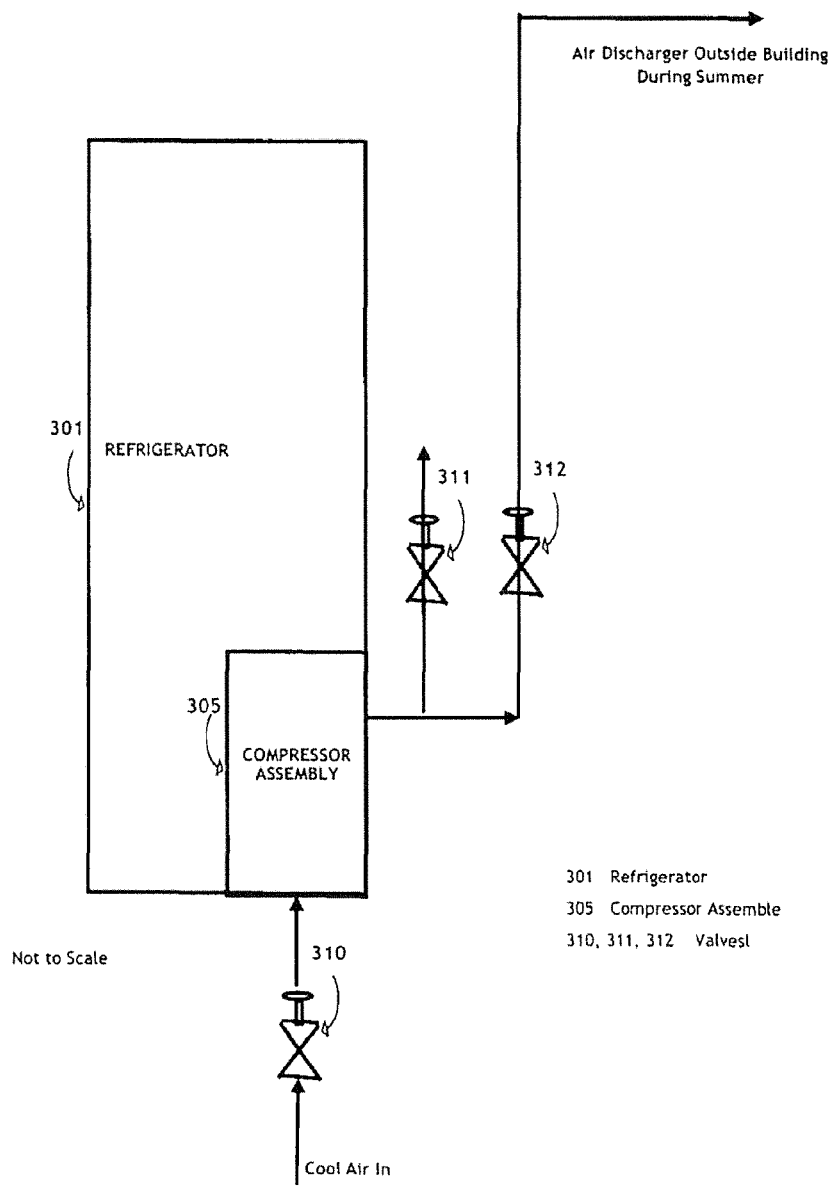

FIG. 6: REFRIGERATOR—HEAT DISCHARGE OUTSIDE THE BUILDING shows how systematically heat from compressor assembly can be recovered and discharged out side a home or a building.

Figure 7:
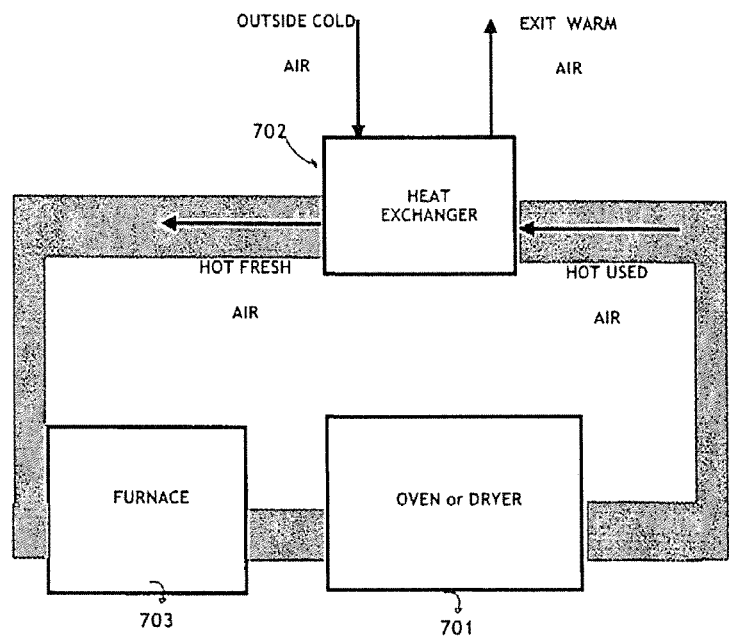

FIG. 7: The diagram shows the recovery of heat from exit gases for various types of ovens and dryers used in industrial operations.

Figure 8A:
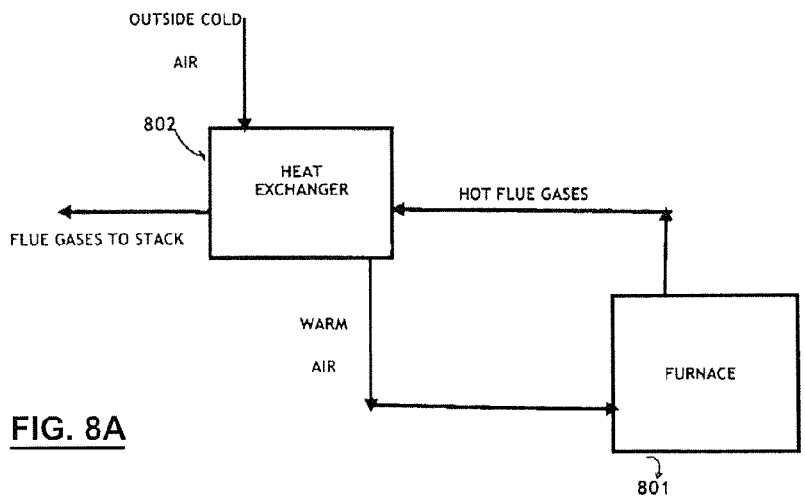
Figure 8B:
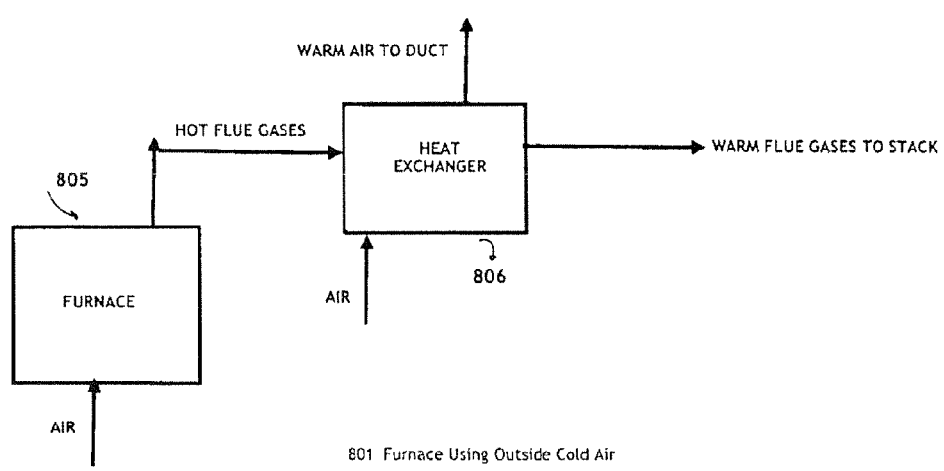

FIGS. 8A and 8B: Show the recovery of heat from flue gases to preheat the air in high efficiency furnaces or to recover the heat from flue gases by passing it through a heat exchanger and circulate hot air inside the building ducting by means of a blower.

DETAILED DISCLOSURE

In the heating system, air used in the combustion of fuel such as natural gas, propane or oil can be preheated by use of a heat exchanger and passing of flue gas through a heat exchanger to preheat the air. This method can also be used for dryers and ovens to reheat the air by use of heat exchanger. In the heating system, use of air sucked from the soil is preferred, which is warmer than the outside air during winter season. This air is further heated by circulating through a heat exchanger to recover heat from the existing flue gases. After warming the air, it is used in the combustion of natural gas, propane or oil. This method prevents suction of cold air from outside to replace air used in the combustion in a furnace in a home or a building, which exit through a stack or chimney as flue gas. When outside air is not used in the combustion process, the flue gas can be passed through the heat exchanger to recover heat and air from the room can be heated by means of a blower and can be introduced into a circulation air duct.

In cooling method cool air from ground is pumped and circulating air from inside a home or a building is cooled in a Heat Exchanger. As an alternate method cold water is used to cool the air in a Heat Exchanger that is circulated inside a home or a building.

In a refrigeration process heat is generated by a compressor that is dissipated inside a home or a building. During summer this adds load on the air-conditioning system. The heat generated by the compressor is removed by air and discharged outside a home or a building during summer and inside during winter for re-use.

A. Heating

FIG. 1 shows Soil Air extraction pump (15) is connected to a soil air extraction well, which consists of a solid plastic pipe (12) and is installed at least 2 feet below sub surface and a soil air extraction screen (10) is connected. This screen has cuts or perforations to suck air from the soil. This pump (15) creates a negative pressure or vacuum in the pipe connected to a pump before air is discharged. The air is passed through a knock out tank or a dehumidifier (21) to remove any access water absorbed from soil and/or to dry the air as much as possible. The temperature of air at this point is as low as 50 degree F. The air is passed through a heat exchanger (25) to further heat the air up to 100 degree F. This is accomplished by recovering heat from the flue gases by another heat exchanger (FIG. 2—(35)). A fluid such as water can be circulated in a heat exchanger (35) to recover heat from the flue gases. The temperature of water can be as high as 125 degree F. This water is circulated through heat exchanger (25) and hot air is fed to air and water heater furnaces. The heated air (60) is introduced into the furnace at the rate required to burn natural gas, propane or oil. The burned gases that is the flue gases run through heat exchanger (35) for heat recovery before exit through a stack.

During winter air is heated to supply the furnace with warm air. During summer valve (90) is closed and valve (91) is opened so that the same cold air can be used for cooling.

Figure 2:
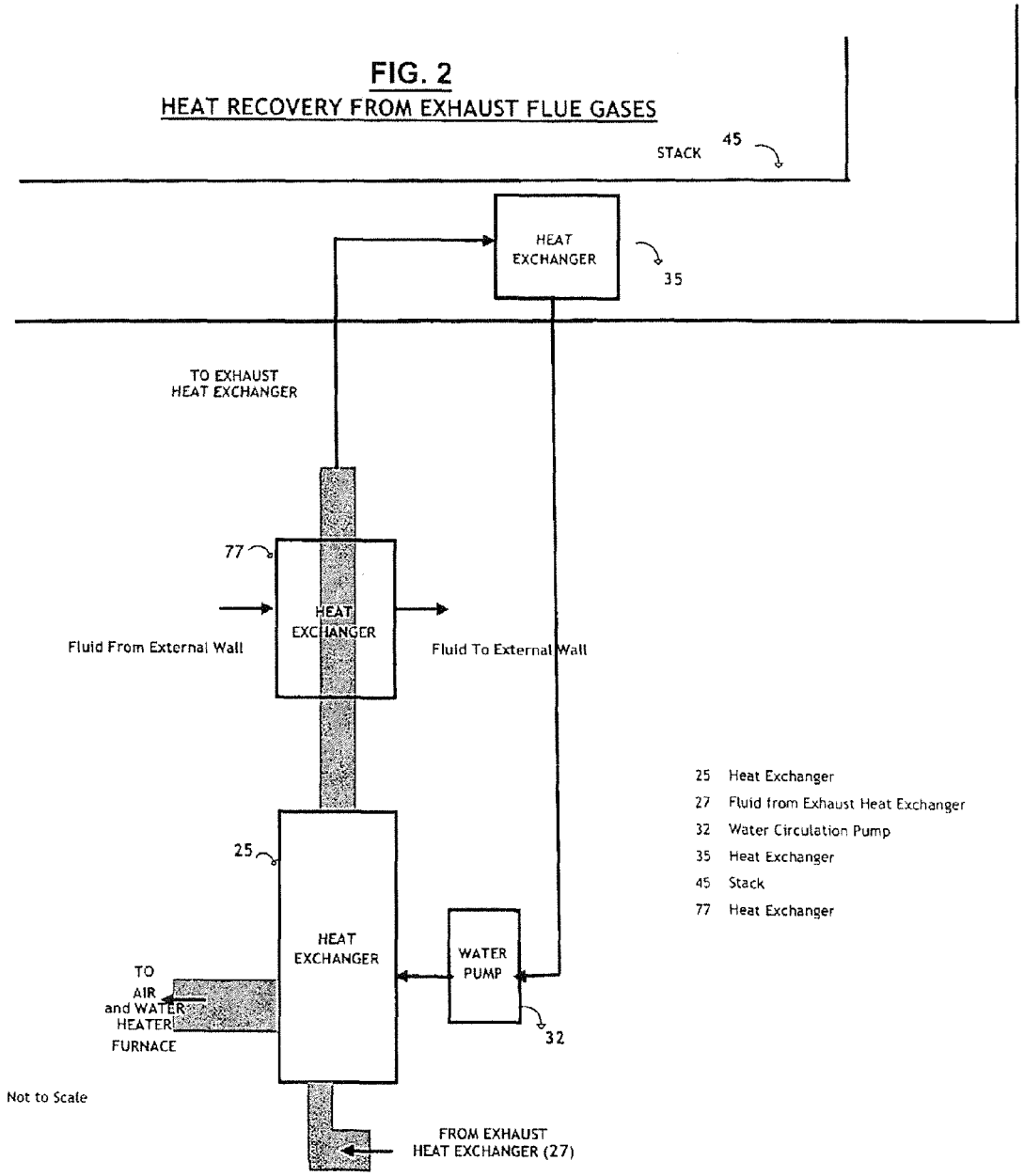

FIG. 2 shows how heat is recovered from the exit flue gases. A heat exchanger (35) is installed in the stack (45) and water is circulated through the heat exchanger so that the temperature of exit water is over 100 degree F. This water is circulated by a water pump (32) to a heat exchanger (25) to heat the air that is received from heat exchanger (27). In order to recover most of the heat another heat exchanger (77) is installed in series and heat recovered by the fluid is circulated between the dry wall and out side of a home or a building as shown in FIG. 3.

Another method is to use out side cold air and to be treated before using in the combustion furnace. In this method cold air from out side is pumped and cooled with water that is pumped from the ground or Municipal tap water. This will increase the temperature of water to approximately 50 degree F. The air will run through a soil air extraction pump (15) and knock out tank (21) before pre heated from the heat recovered by heat exchanger (25). The hot air is then sent to the furnace for combustion.

In the heating system in high efficiency furnaces, air is pumped from outside and passed through a heat exchanger (802) and preheated by extracting heat from the flue gas before used in the combustion in the furnace (801). The flue gases that exit sent through a heat exchanger (802) before exiting through the stack. In older type furnaces or heaters (805), air is sucked from inside the building. In this case heat can be recovered from the flue gases by passing through a heat exchanger (806) and the hot air can be pumped directly to the circulation ducts. In case of dryers and ovens, the exit air from this equipment can be passed through a heat exchanger (702) to recover heat and to preheat the air that is fed to the dryer or oven (701) so the heat load on the furnace (703) is minimum. In this type of equipment more than 90% of the heat can be recovered.

B. Air Conditioning and Cooling Operation

The temperature of air pumped by Soil Air Extraction pump (15) is very cool and close to the temperature of the ground water. Temperature of ground water/soil during summer months can be as cool as 50 degree F. Therefore this method is used to keep a home or a building cooler between 70 and 80 degree F. during summer months when outside air temperature can reach 120 degree F. or higher. The cool air is pumped by a soil air extraction pump (15) through a well installed in a ground as shown in diagram 1. This well consists of a screen (10) and a solid pipe (12) connected to the soil air extraction pump (15). The air is pumped through a knock out tank or a dehumidifier (21) to remove any excess water. During summer the valve to the furnace (90) is shut down and valve (91) is open for use of air for cooling. The air runs through a heat exchanger (68) to cool the air that is circulated through a home or a building. The air used for cooling pump by soil air extraction pump (15) is disposed off out side the building.

FIG. 4 depicts an embodiment of a method in which cold water is circulated through the heat exchanger to cool the air circulated in a home or a building. FIG. 4 shows the use of water to cool the air. A well is installed to pump the water from the ground. Pump (105) is installed in a bored well inside a plastic pipe (101) to pump water (112) from the ground. The water is forced through a heat exchanger (135) to cool the air that is circulated to the house. Air from a home or a building is circulated (140) and cooled by water (112) and air is circulated (141) to a home or a building to keep the temperature at desired number. The water from the heat exchanger (135) can be used for watering the lawn or garden. As an alternative the valve (102) can be closed and (103) can be opened so that water can be cooled in the cooling tower (145) and recycled for reuse. Another method is to use the water from Municipal tap water and pumped through the system via heat exchanger (135) to cool the air that is circulated in a home or a building. Valves (104 and 105) are installed to either use a tap water or ground water or both. The cool water can also be circulated as shown in the diagram 3 to keep the walls of the building cool during the summer months. The water is pumped through a heat exchanger (77) that circulates cold water through heat exchanger (92) to keep the space between dry wall and outside of the building cool.

FIG. 5 shows how air can be directly pumped from the ground and circulated in a home or a building. In this method soil air extraction pump (215) is used to pump air from a soil air extraction well. This air is cold at the ground water temperature. In earlier method the air is not used directly but was disposed out side the building. When the air is directly used and introduced in side the building it should meet the air quality standards. After pumping the air from the ground by soil air extraction pump (215) the air is passed through a dehumidifier (225) and then through an activated carbon cell (235) to remove any impurities carried by the air from the ground. The air is regularly checked to make sure that it is clean and meets the air quality standards.

For keeping the food items cool, to make ice and cold water in a refrigerator, the refrigeration system discharges hot air to the surroundings. During summer the use of refrigeration system is at a maximum and maximum amount of heat that is releases adds load to the air conditioning system in a home or a building. To reduce the additional burden on the air conditioning system, the compressor assembly (305) is cooled by air and disposed off out side the building. As shown in FIG. 6, for a refrigerator (301) during summer the valve (311) is closed and valve (312) is opened and during winter valve (312) is closed and valve (311) is open to discharge heat inside a home and a building.

I claim:

1. A system for heating, the system comprising:
   a dryer that burns fuel and air to generate hot exhaust;
   an exhaust stack connected to the dryer, wherein the hot exhaust is emitted by the dryer to the exhaust stack;
   a first heat exchanger located in the exhaust stack and defining at least first and second pathways, the first pathway receives the hot exhaust and emits cooled exhaust, the second pathway receives a cooled first fluid and emits a heated first fluid and heat exchanger transfers heat from the hot exhaust to the first fluid to cool the hot exhaust and heat the first fluid; and
   a second heat exchanger that receives the heated first fluid from the first heat exchanger and receives ambient air, the second heat exchanger transfers heat from the first fluid to the received ambient air to heat the ambient air and cool the first fluid;
   wherein the heated ambient air is supplied to the dryer to be burned by the dryer.

2. The system of claim 1, wherein the dryer is located in an enclosure and the ambient air is located outside of the enclosure.

3. The system of claim 1, further comprising:
   a duct thermally coupled to the dryer;
   wherein the dryer burns fuel and air to heat circulation air within the duct.

4. A method of improving fuel efficiency of a dryer, the method comprising:
   operating a dryer to burn fuel and air to create hot exhaust;
   passing the hot exhaust through a first heat exchanger;
   heating a first fluid with the first heat exchanger by transferring heat from the hot exhaust to the first fluid, which cools the hot exhaust;
   supplying the heated first fluid to a second heat exchanger;
   passing ambient air through the second heat exchanger;
   heating the ambient air with the second heat exchanger by transferring heat from the first fluid to the ambient air, which cools the first fluid; and
   supplying the heated ambient air from the heat exchanger to the dryer to be burned in the dryer.

5. A system for heating an enclosure, the system comprising:
   a furnace that burns fuel and air to produce hot exhaust;
   a soil air extraction system extracts air from underground;
   a first heat exchanger that receives the hot exhaust from the furnace a second heat exchanger which receives the air extracted by the soil air extraction system and receives the first fluid from the first heat exchanger, the second heat exchanger causes heat energy to transfer from the first fluid to the extracted air;
   wherein the first and second heat exchangers cause heat energy to transfer between the hot exhaust and the extracted air to heat the extracted air and cool the hot exhaust and the extracted air is supplied from the second heat exchanger to the furnace to be burned in the furnace.

6. The system of claim 5, wherein the soil air extraction system comprises:
   an extraction well that extends into soil below the enclosure; and
   an extraction pump that extracts air out from the soil.

7. The system of claim 5, wherein ambient air from outside of the enclosure is combined with air extracted by the soil air extraction system upstream of the heat exchanger.

8. The system of claim 7, comprising a valve controlling flow of the ambient air to the heat exchanger.

9. The system of claim 8, wherein the valve is opened when the ambient air is above a predetermined temperature and wherein the valve is closed when the ambient air is below a predetermined temperature.

10. The system of claim 5, comprising a valve disposed between the soil air extraction system and the heat exchanger, wherein the valve opens to supply air from the soil air extraction system to the heat exchanger during operation of the furnace.

11. The system of claim 10, wherein when the furnace is not operating, the valve supplies air from the soil air extraction system into the enclosure to cool the enclosure.

12. The system of claim 5, further comprising:
   a duct thermally coupled to the furnace;
   wherein the furnace burns fuel and the heated extracted air to heat circulation air within the duct.

13. The system of claim 12, wherein the duct directs the heated circulation air into the enclosure to heat the enclosure.

14. The system of claim 5, further comprising:
   a chimney stack connected between the furnace and the first heat exchanger, the chimney stack provides the hot exhaust from the furnace to the first heat exchanger, wherein the hot exhaust is hot combustion exhaust.

15. The system of claim 14, wherein the furnace burns the fuel and the air extracted by the soil air extraction system to produce the hot combustion exhaust.

16. A method of heating an enclosure, the method comprising:
operating a furnace to burn fuel and air to produce hot exhaust;
supplying the hot exhaust to a first heat exchanger;
heating a first fluid with the first heat exchanger by transferring heat energy from the hot exhaust to the first fluid;
circulating the heated first fluid to a second heat exchanger;
operating a soil air extraction system to extract air from underground;
supplying the extracted air to the second heat exchanger;
transferring heat energy from the first fluid to the extracted air with the second heat exchanger to heat the extracted air; and
supplying the heated extracted air from the second heat exchanger to the furnace to be burned in the furnace.

17. The method of claim 16, further comprising:
selectively combining the extracted air with ambient air from outside of the enclosure; and
supplying the extracted air and the ambient air to the second heat exchanger.

18. The method of claim 16, comprising:
operating a valve to supply the extracted air to one of the second heat exchanger and the enclosure.

19. The method of claim 18, comprising the steps of supplying the extracted air to the second heat exchanger when the furnace is being operated, and supplying the extracted air to the structure to cool the structure when the furnace is not being operated.

20. A system for heating an enclosure, the system comprising:
a furnace that burns fuel and air to produce hot exhaust;
a first heat exchanger that receives the hot exhaust from the furnace and transfers heat energy from the hot exhaust to a first fluid circulating through the first heat exchanger; and
a second heat exchanger that receives air to be burned by the furnace and receives the first fluid from the first heat exchanger, the second heat exchanger transfers heat energy from the first fluid to the air to be burned to heat the air to be burned, wherein the heated air to be burned is supplied to the furnace from the second heat exchanger.

* * * * *